(12) United States Patent
Hu et al.

(10) Patent No.: US 7,401,545 B2
(45) Date of Patent: Jul. 22, 2008

(54) METHOD AND APPARATUS FOR OPTIMIZING VARIABLE LIQUID TEMPERATURES

(75) Inventors: Ruguo Hu, New Milford, CT (US); Megan E. Walters, New Milford, CT (US)

(73) Assignee: Nestec S.A., Vevey (CH)

( * ) Notice: Subject to any disclaimer, the term of this patent is extended or adjusted under 35 U.S.C. 154(b) by 619 days.

(21) Appl. No.: 10/983,671

(22) Filed: Nov. 9, 2004

(65) Prior Publication Data

US 2006/0096465 A1 May 11, 2006

(51) Int. Cl.
*A47J 31/00* (2006.01)

(52) U.S. Cl. .......................................... 99/281; 99/280

(58) Field of Classification Search .................. 99/281, 99/282, 283, 280, 290
See application file for complete search history.

(56) References Cited

U.S. PATENT DOCUMENTS

| 5,093,897 | A | | 3/1992 | Peteri et al. | |
|---|---|---|---|---|---|
| 5,440,972 | A | * | 8/1995 | English | 99/282 |
| 5,455,887 | A | * | 10/1995 | Dam | 392/467 |
| 5,549,035 | A | * | 8/1996 | Wing-Chung | 99/281 |
| 5,738,001 | A | * | 4/1998 | Liverani | 99/283 |
| 5,858,437 | A | | 1/1999 | Anson | |
| 5,941,163 | A | | 8/1999 | Park et al. | |
| 5,981,916 | A | * | 11/1999 | Griffiths et al. | 219/492 |
| 6,098,524 | A | | 8/2000 | Reese | |
| 6,135,010 | A | | 10/2000 | Husted et al. | |
| 6,459,854 | B1 | | 10/2002 | Yoakim et al. | |
| 6,460,735 | B1 | | 10/2002 | Greenwald et al. | |
| 2001/0036497 | A1 | | 11/2001 | Zeller et al. | |
| 2002/0129712 | A1 | * | 9/2002 | Westbrook et al. | 99/279 |
| 2002/0130137 | A1 | * | 9/2002 | Greenwald et al. | 222/54 |
| 2003/0207017 | A1 | | 11/2003 | Apiscopa et al. | |
| 2004/0031395 | A1 | * | 2/2004 | Wroblewski | 99/281 |
| 2004/0197444 | A1 | | 10/2004 | Halliday et al. | |

FOREIGN PATENT DOCUMENTS

| DE | 1474732 | 4/1969 |
|---|---|---|
| EP | 0 380 947 | 8/1990 |
| EP | 0 512 470 | 11/1992 |
| EP | 0 771 542 | 5/1997 |
| EP | 0 935 938 | 8/1999 |
| EP | 1 522 247 | 4/2005 |
| JP | 2001061662 | 3/2001 |
| JP | 2003225164 | 8/2003 |
| WO | WO 02/076270 | 10/2002 |
| WO | WO 03/059778 | 7/2003 |
| WO | WO 2004/006742 | 1/2004 |

* cited by examiner

*Primary Examiner*—Reginald L Alexander
(74) *Attorney, Agent, or Firm*—Borden Ladner Gervais LLP

(57) ABSTRACT

A method, apparatus, and related beverage profiles for on-demand heating of liquid used for beverage dispensing where such heating is dynamically variable according to the applicable profile. The apparatus includes a heating unit, electronic controller, and sensing devices. A water tank supplies the heating unit via a water pump controlled by the controller that also controls the heating unit. Feedback control loops provide control data to the controller to optimize liquid temperatures for a given beverage type in accordance with predetermined profiles.

7 Claims, 2 Drawing Sheets

METHOD AND APPARATUS FOR OPTIMIZING VARIABLE LIQUID TEMPERATURES

FIELD OF THE INVENTION

The present invention relates generally to on-demand heating of liquid. More particularly, the present invention relates to a method and apparatus related to on-demand heating for beverage dispensing where such heating is dynamically variable.

BACKGROUND OF THE INVENTION

Within the self-service vending machine industry, many machines exist to prepare heated mixtures. Often, repetitive preparation of multiple, varied beverages and soups occurs using a single serve package from the same machine. Each single serve package is typically in the form of a capsule that contains a measured amount of a dry substance. One such capsule is shown by Denisart et al. within International Publication Number WO 03/059778 A2 published on Jul. 24, 2003.

When a liquid, typically hot water, is introduced to contents of a capsule, a food liquid such as a beverage or soup is thus formed. Different food liquids have different requirements to produce the best drinking experience depending upon the given food liquid. Such requirements include crema/foam volume, texture, and the in-cup temperature. Further, the in-cup temperature is related to the foam volume and texture.

Existing liquid heating technology used often in such self-service vending machines is typically only able to deliver hot liquid at one fixed temperature for all products. Most commonly, the heated liquid is water drawn from a public water main with or without filtration, but may also include water drawn from a private source such as a well or compact water tank. Heating water to a fixed temperature for all products limits the possibility to prepare different beverages each with the best quality. In addition, such self-service vending machines cool down during idle periods. Accordingly, the first dispensing of beverage prepared after a machine has been idle for a period of time would deliver beverages with a significant lower in-cup temperature due to the heat lost to the mixing device itself, or alternatively, the machine would require a significant warm-up time in order for the water to reach the desired in-cup temperature.

On-demand or instant heaters are known for the use in beverage systems. Such on-demand or instant heaters are generally defined as heating assemblies that are able to provide an accurate water temperature without requiring a pre-warming time. Such heaters generally include a series of heating components, such as electrical resistors or heating cartridges (e.g., Calrods®), where an initial heating component is controlled to heat the water within a preset temperature range lower than the final preset temperature desired and a second heating component is controlled to adjust, or fine tune, the water to a final preset temperature from the first preset temperature. There exists other sorts of instant heaters which are not based on Calrods® or ceramic insulated type heating elements, but rather on thick film technology. Such heaters may be formed by a hollow annular member with thick film type resistors printed thereon as shown by U.S. Pat. No. 6,459,854 issued to Yoakim et al. on Oct. 1, 2002 or as shown by Boussemart et al. within International Publication Number WO 2004/006742 published Jan. 22, 2004.

It would accordingly be desirable to provide a system for dispensing food liquids that overcomes difficulties associated with existing self-service vending machines. It is, therefore, desirable to provide an improved beverage dispensing system that would benefit from incorporation of an on-demand heater that is able to deliver hot liquid/water at any temperature and ideally vary such temperature dynamically. What would be needed is an improved beverage dispensing system optimized for delivering improved crema/foam and in-cup temperature, in terms of efficient dissolution of the powder/liquid, creation of foam inside the capsule, and compensation for the heat loss during the beverage flowing into the cup.

SUMMARY OF THE INVENTION

It is an object of the present invention to obviate or mitigate at least one disadvantage of previous brewing machines.

In a first aspect, the present invention provides an apparatus for optimizing variable liquid temperatures within a beverage machine, said apparatus comprising: a heating unit for heating a liquid flowing therethrough; a power supply for activating said heating unit; an electronic controller for variably controlling a flow rate of said liquid through said heating unit and/or an input power supplied to said heating unit by said power supply; feedback means for providing sensed data to said electronic controller; and wherein said flow rate and/or said input power are varied by said electronic controller in response to said sensed data in accordance with a profile that represents a predetermined heating level and/or at a predetermined flow rate.

In a second aspect, the present invention provides a method for optimizing variable liquid temperatures within a beverage machine, said method comprising: initiating a profile related to a predetermined beverage type, said profile including a series of target temperatures and/or target flow rates; obtaining a temperature of a heated liquid heated by a heating unit; optionally obtaining a flow rate of said heated liquid; and modifying said temperature and/or said flow rate over a period of time in accordance with said profile.

In a third aspect, the present invention provides a profile used for optimizing characteristics of a soluble component by variable liquid temperatures within a beverage machine, said profile comprising: a first temperature for increasing dissolution of said soluble component to form a beverage product; and a second temperature for brewing said beverage product via said soluble component, said second temperature being lower than said first temperature.

In a fourth aspect, the present invention provides a profile used for optimizing characteristics of a soluble component by variable liquid temperatures within a beverage machine, said profile comprising: a first temperature for increasing dissolution of said soluble component to form a beverage product; a second temperature for brewing said beverage product via said soluble component, said second temperature being lower than said first temperature; and a third temperature for increasing desirable characteristics of said beverage product, said third temperature being higher than said second temperature; and a fourth temperature for evacuating substantially all residuals of said soluble component, said fourth temperature being higher than said third temperature.

In a fifth aspect, the present invention provides a profile embodied in an electronic memory and used for optimizing characteristics of a soluble component by variable liquid temperatures within a beverage machine, said profile comprising: a first temperature for increasing dissolution of said soluble component to form a beverage product; a second temperature for brewing said beverage product via said soluble component, said second temperature being lower than said first temperature; and a third temperature for increasing desirable characteristics of said beverage product, said third temperature being higher than said second temperature; and a fourth temperature for evacuating substantially all residuals of said soluble component, said fourth temperature being higher than said third temperature.

In a sixth aspect, the present invention provides a profile embodied in an electronic memory and used for optimizing characteristics of a soluble component by variable liquid temperatures within a beverage machine, said profile comprising: a first temperature for increasing dissolution of said soluble component to form a beverage product; and a second temperature for brewing said beverage product via said soluble component, said second temperature being lower than said first temperature.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and apparatus for delivering variable liquid temperatures dynamically in response to criteria that may at least include heat losses at startup, electrical supply fluctuations, beverage selection, and brewing characteristics. The invention will therefore result in an improved quality and customer appeal of a dispensed product.

Figure 1:
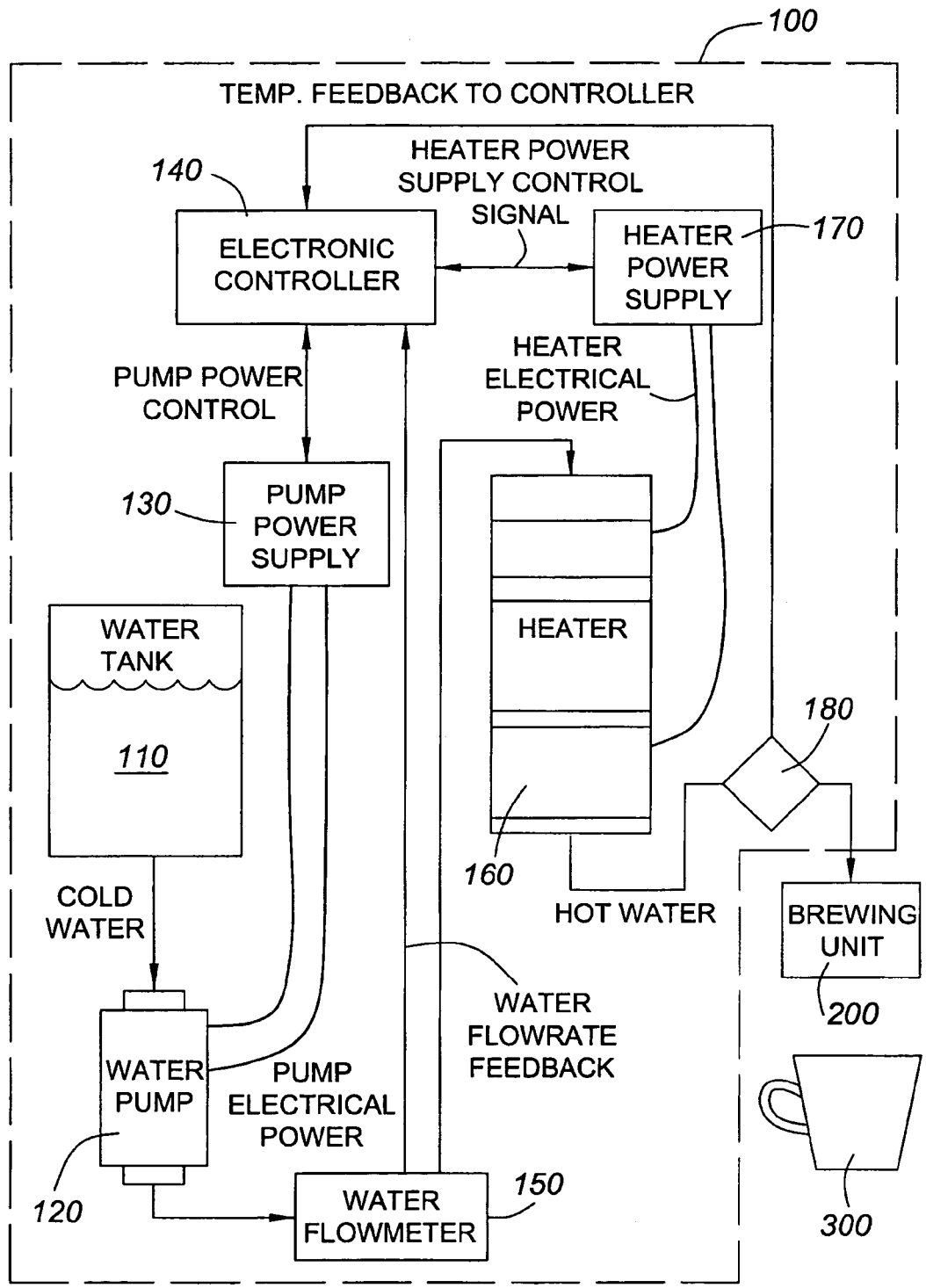
FIG. 1 is a general schematic of the heating apparatus in accordance with the present invention along with a brewing unit and a dispensing cup.

With reference to FIG. 1, a heating apparatus 100 for delivering variable liquid temperatures is shown in conjunction with a brewing unit 200 and a dispensing cup 300. It should be understood that the brewing unit 200 may be any known type of self-service vending machines that deliver soup, coffee, tea, hot cocoa or any similar heated food liquid. For purposes of illustration, the heating apparatus 100 is shown separate from the brewing unit 200 though it is well within the intended scope of the present invention to integrate the heating apparatus with the brewing unit. It is further apparent that interchangeability with various manufacturers of brewing units would be increased if the heating apparatus 100 were self-contained and separate from the brewing unit 200, while cost effectiveness and compactness would be increased should the heating apparatus 100 and brewing unit 200 be integrated. It should further be understood that the dispensing cup 300 may be any container that is usable to hold the dispensed heated food liquid. Such dispensing cup 300 may therefore be reusable, disposable, ceramic, metallic, paper, plastic, or any combination. Such dispensing cup 300 may be provided by the user or provided by a container dispenser that forms a part of an overall self-service vending machine that incorporates the present invention. Accordingly, details related to the brewing unit 200 and the dispensing cup 300 will not be discussed in detail as these may vary in accordance with the given use and application of the related self-service vending machine. Such implementation details are well within the scope of one skilled in the art and the discussion herein below will therefore relate primarily to the heating apparatus 100 and related method for optimizing variable liquid temperatures.

With further reference to the heating apparatus 100 as shown in FIG. 1, there is provided a water tank 110. The water tank 110 is sourced (not shown) via any known manner such as, but not limited to, a private supply (e.g., water cooler) or a municipal tap water system. The water tank 110 serves as a ready supply of cold water that is drawn up into a heating unit 160 via a water pump 120. The water pump 120 is energized by way of a pump power supply 130 that is controlled via an electronic controller 140. The electronic controller 140 also controls the heating unit 160. Feedback control loops exist between the electronic controller 140 and both a water flow meter 150 and a temperature sensor 180. The water flow meter 150 is located between the water pump 120 and the heating unit 160. The temperature sensor 180 is located between the heating unit 160 and the brewing unit 200. The brewing unit 200 serves to create a food liquid from the heated water provided from the heating apparatus 100 and thereby dispense the food liquid into a cup 300, or similar container, in a manner well known to those skilled in the art of self-service vending machines.

The electronic controller 140 is a central feature to the present inventive apparatus and method. As mentioned above, water flow rate and temperature are two criteria that are sensed and fed back to the electronic controller 140 in order to maintain appropriate temperature and water flow. It has been realized that appropriate temperature and water flow differ given the food liquid generated. For instance, a slow brew at a lower temperature may be desirable for one particular food liquid, while a fast brew at a high temperature may be desirable for a different food liquid. This is evident even among various grinds of coffee.

As mentioned above in the background section, the prior art heating devices are designed to provide a single temperature without regard to differing food liquids or other variables that may affect heating. In contrast, the present invention is capable of taking into account several variables to provide optimized variable liquid temperatures. Average increases in foam volumes of 15-25% with a foam having finer bubbles and lighter color are possible for cappuccino brewing in accordance with the present invention as compared to the conventional brewing at constant temperature. Average foam volume increases of 20-30% and increased creaminess are possible for espresso brewing in accordance with the present invention as compared to the conventional brewing at constant temperature. Further, minimum residual remain in the capsule after use for hot chocolate brewing in accordance with the present invention as compared to the conventional brewing at constant temperature.

Variables that occur with regard to self-service vending machines may include the amount of use that such machine may receive and the period of time between dispensings. These variables directly equate to the warming of the inner-workings of the brewing unit 200. For instance, if the given brewing unit 200 is used repeatedly for thirty minutes in the morning it would be apparent that the first use would occur when the brewing unit was in a cold state such that the physical inner-workings of the brewing unit 200 would be heat absorbent. By the final cup brewed at the end of the thirty minutes, it would further be apparent that the brewing unit 200 would be in a warmed state whereby the physical innerworkings of the brewing unit 200 would be heat saturated. Such heat fluctuations have been found to directly impact the quality of the brewed product. Still further, some types of brewing units 200 may more readily absorb and retain heat transferred from the hot water flowing therethrough, while other types may be more transparent to heat such that hot water flowing therethrough is relatively unchanged in temperature and flow.

Still other variables may exist including electrical supply factors based upon time of day. Indeed, it is well understood that the power supply voltage obtained from a wall outlet may vary according to the time of day. Often, such variances are due to load demand on the electrical power grid based on usage. During the morning hours before office workers have begun their workday, computers, printers, and photocopiers may still not yet be running at their maximum load. However, such load demands increase by late morning. These fluctuations in demand have repercussions on certain electrical devices including devices such as electrical resistance heaters such as those used in self-service vending machines. As the power supply from the outlet is reduced in terms of readily available voltage, the heating capacity of a typical resistance heater is reduced. Accordingly, the heating capacity provided to a typical brewing type of self-service vending machine varies according to the time of day.

The heating unit 160 is an on-demand heater that is enabled, via the electronic controller 140 and related feedback, to deliver hot liquid/water at any temperature to the brewing unit 200. The temperature of the hot liquid/water is adjusted dynamically and is optimized for the preparation of the best crema/foam and in-cup temperature. The optimization of the water temperature is accomplished in terms of efficient dissolution of the powder/liquid, creation of foam inside the capsule, and compensation for any heat loss during the brewing of the beverage and flowing of the beverage into the cup. The heating unit 160 can therefore dynamically deliver the heated liquid at any preset temperature. Moreover, the overall heating apparatus 100 of the present invention may take into account and compensate for the variation in the supplied electric voltage, the liquid flow rate due to difference of capsules, the potential heat loss due to the machine, the type of brewing unit involved, and the type of food liquid being brewed.

As suggested above, the use of the electronic controller 140 not only enables active feedback loops to monitor and maintain a desired flow rate and temperature, but also allows for predetermined variations to occur in the flow rate and temperature. The electronic controller 140 of the present invention includes programmable circuitry that controls water flow and temperature. As is well known in the art of controllers, such circuitry may be in the form of a computer chip (i.e., integrated circuit, or IC) having an electronic memory (not shown) that may be read-only or read-write. Such an IC is intended to have programmed into such electronic memory certain profiles. Each profile includes pre-established heating specifications for a given type of food liquid being brewed as explained in detail further below. The profiles may be further adjustable by the electronic controller 140 based upon the type of brewing unit 200 accompanying the heating apparatus 100. Further adjustments to the profiles may be made due to time of day or due to directly sensed voltage fluctuations in the supply voltage to the heating apparatus 100 where an additional supply voltage sensor (not shown) would be provided.

The profiles stored by the programmable circuitry of the electronic controller 140 will now be discussed. For best foaming results, the heating apparatus 100 delivers hot liquid at a higher temperature at the beginning of a brewing procedure. This ensures all the powdered material within a capsule is dissolved as soon as possible. Thereafter, the heating apparatus 100 delivers hot liquid with a lower temperature so as to generate more dense and stable foams in the cup 300. The difference between the high and low temperature is so managed by the electronic controller 140 that the in-cup temperature of the final beverage is optimal (e.g., a desirable and drinkable temperature) for the average consumer.

Figure 2A:
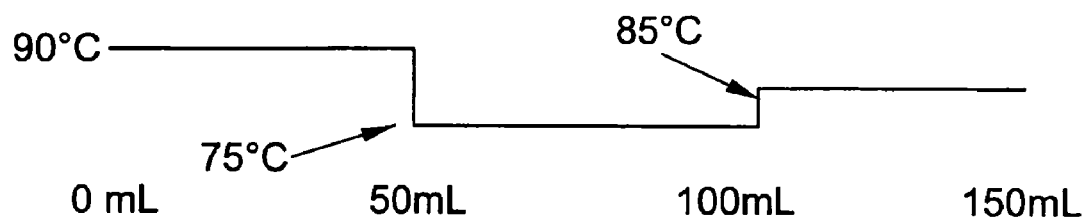
FIG. 2A is a heating profile for a dispensed beverage of a first type in accordance with the present invention.

As an example, for a cappuccino beverage, a capsule contains a mixture of soluble coffee powder and milk powder. Water is injected into the capsule at high temperature to dissolve the powders and create a beverage liquid and a certain amount of foam. A profile for brewing such a cappuccino beverage is show in FIG. 2A. The temperature of the hot water will be first preset at 90° C. for rapid powder dissolution in the capsule and heat loss compensation. Water flow at 90° C. will occur until 50 ml has been processed. Then, the water temperature is lowered to 75° C. for brewing until another 50 ml has been processed. Brewing is followed by a raised temperature of 85° C. for foaming until another 50 ml has been processed. The water may then be heated at higher than 85° C. so as to evacuate the capsule of remaining product. A preferable evacuation temperature would be in the range of 85° C. to 95° C. where such range is chosen so as to not destroy the foam produced.

Figure 2B:
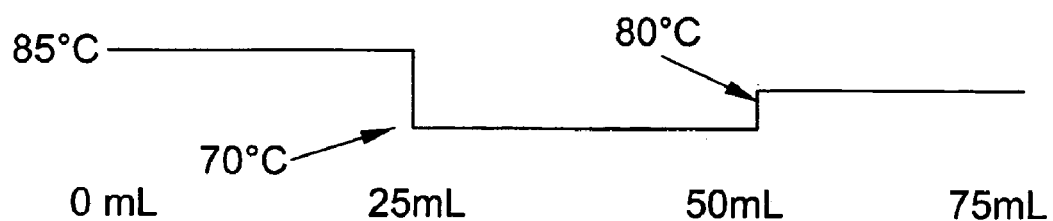
FIG. 2B is a heating profile for a dispensed beverage of a second type in accordance with the present invention.

The same principle can be applied to the preparation of other beverages, including espresso, with optimum taste quality, froth quality, and volume. FIG. 2B shows a suitable profile for brewing an espresso beverage. In such instance, the temperature of the hot water will be first preset at 85° C. Water flow at 85° C. will occur until 25 ml has been processed. The temperature will then be lowered to 70° C. for brewing the finely ground espresso material until another 25 ml has been processed. Then the temperature will be raised to 80° C. for crema production until another 25 ml has been processed. Similar to the cappuccino profile, the water may then be heated at more than 80° C. to evacuate the capsule of remaining product. A preferable evacuation temperature for espresso would be in the range of 80° C. to 85° C. where such range is chosen so as to not destroy the crema produced.

Figure 2C:
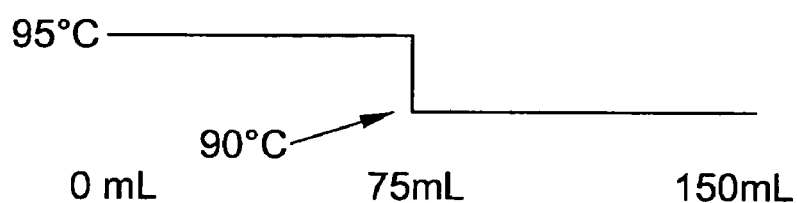
FIG. 2C is a heating profile for a dispensed beverage of a third type in accordance with the present invention.

Still further, FIG. 2C shows a profile for best extraction results of leaf tea capsules. Such a profile would raise the initial water temperature to 95° C. for the initial extraction, when the leaf tea absorbs heat. Then, the hot liquid temperature is reduced to 90° C. so as not to extract too many of the unfavorable materials from the leaf tea, resulting in a better tasting beverage. This example of the tea dispense demonstrates the heating apparatus 100 delivering hot water first at 95° C. and then at 90° C., with set volumes.

While three specific examples of profiles for particular beverages is shown and described above in regard to FIGS. 2A-2C, it should be readily apparent that other beverages may utilize differing, unique, profiles. Such various profiles are possible without straying from the intended scope of the present invention.

It should be understood from this description of profiles that the heating apparatus 100 may include a heat function that follows a preset program based on the request made from the specific brewing unit beverage type button. However, as mentioned above, the profile itself may further by modified (i.e., optimized) to compensate for time of day, type of brewing unit, usage patterns, or any other variables that may alter the operation or heating characteristics of the heating unit 160. Specifically, it should be understood that the temperature values noted above are only examples of dispense temperatures for the above-noted products. These examples should not limit the parameters of these or other products as they may vary based upon a given application. For instance, the desired serving temperature for any given beverage (e.g., hot cocoa) in a commercial establishment open to the general population may be different from the desired serving temperature for the same beverage in an elementary school cafeteria.

In operation of the present invention, the electronic controller 140 initiates one set of programs to control the hot water temperature depending upon which product is prepared. This may occur by way of user input depending upon, for example, which button is pushed on the overall self-service vending machine incorporating the invention. Alternatively, this may occur via an automatic detection mechanism where the overall self-service vending machine incorporating the invention detects what product is used for beverage brewing in terms of physical, chemical, or electronic sensing. The temperature sensor 180 measures the hot water temperature and sends the signal back to the electronic controller 140. The water flow meter 150 sends a signal to the electronic controller 140 and the electronic controller 140 compares the hot water temperature to the target temperature. The target temperature of course varies according to the hot water temperature profile for the given beverage. The electronic controller 140 calculates any temperature correction needed based upon the water flow rate and the sensed hot water temperature. The electronic controller 140 may further calculate any temperature correction needed based upon the time of day, type of brewing unit, sensed supply voltage fluctuations, or the like. It should be readily understood that further sensing devices and additional related feedback loops to the electronic controller 140 may therefore be needed. The electronic controller 140 then sends the control signal to the heater power supply 170 in order to direct the heating unit 160 to increase/decrease heating energy, and/or to control the pump power supply to increase/decrease the water flow rate, so that the hot water will be at the target temperature. This control cycle repeats itself continuously a few times per second so as to have the hot water delivered to follow any preset temperature profile.

As suggested above, the brewing or dissolution principle of the capsule in the beverage dispenser can encompass many variations in terms of differing capsules and differing brewing units. The present invention is suitable for beverage preparation via a brewing unit of the type as shown by Majer Doglioni within International Publication Number WO 02/076270 published on Oct. 3, 2002. Such brewing unit includes a collecting device with a seat designed to contain a capsule, wherein a plunger enters through an opening in the bottom of the capsule; water is injected through the top of the capsule which dissolves the powder inside the capsule and the beverage is then released in a laminar flow between the surface of the plunger and the edges of the opening. Other brewing units can benefit from the use of the present invention such as a Nespresso® capsule system as described in European Patent Number EP 0 512 470 B1 issued to Olivier et al. and published on Apr. 24, 1996, a multi-beverage capsule system described in WO 2003/059778, or even a typical powder beverage dispenser with traditional canisters, dosing means, and a mixing bowl. Use of the present invention with such brewing units results in an advantageous intelligent hot beverage system with ability to deliver hot beverage of varied temperature where such system may optimize itself to deliver hot liquid for best results of powder reconstitution, dissolution, foaming (or no foaming), taking into account the variation of electric voltage, flow rate, and heat loss in the given self-serve vending machine.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An apparatus for optimizing variable liquid temperatures within a beverage machine, said apparatus comprising:
    a heating unit for heating a liquid flowing therethrough;
    a power supply for activating said heating unit;
    an electronic controller for variably controlling an input power supplied to said heating unit by said power supply;
    feedback means for providing sensed data representing time of day, time since last brewing and fluctuations in power supply voltage to said electronic controller; and
    wherein said input power is varied by said electronic controller in response to said sensed data in accordance with a profile that represents a predetermined heating level.

2. The apparatus as claimed in claim 1 wherein said profile is selectable from a group of differing profiles where each said differing profile relates to a beverage type.

3. The apparatus as claimed in claim 2 wherein said beverage type is chosen by a user of said beverage machine to thereby determine said profile used by said electronic controller.

4. The apparatus as claimed in claim 2 wherein said beverage type is determined by said beverage machine to thereby determine said profile used by said electronic controller.

5. The apparatus as claimed in claim 1 wherein said electronic controller also variably controls a flow rate of said liquid through said heating unit wherein said flow rate is also varied by said electronic controller in response to said sensed data in accordance with said profile that represents said predetermined heating level at a predetermined flow rate.

6. The apparatus as claimed in claim 5 wherein said feedback means includes
    a flow meter for providing flow feedback data related to a flow rate of said liquid through said heating unit, and
    a temperature sensor for providing temperature feedback data related to a heated temperature of said liquid flowing from said heating unit.

7. The apparatus as claimed in claim 1 wherein said feedback means includes a temperature sensor for providing temperature feedback data related to a heated temperature of said liquid flowing from said heating unit.

* * * * *